June 2, 1970  R. S. WISE  3,515,802
SPECIAL EFFECTS ELECTRONIC SIMULATOR
Filed April 27, 1967  11 Sheets-Sheet 1

Fig_1

INVENTOR.
RICHARD S. WISE
BY
Campbell & Harris
ATTORNEYS

INVENTOR.
RICHARD S. WISE
BY
Campbell & Harris
ATTORNEYS

Fig-9

June 2, 1970  R. S. WISE  3,515,802
SPECIAL EFFECTS ELECTRONIC SIMULATOR
Filed April 27, 1967  11 Sheets-Sheet 9

Fig-11

INVENTOR.
RICHARD S. WISE
BY
Campbell & Harris
ATTORNEYS

Fig_12

June 2, 1970  R. S. WISE  3,515,802
SPECIAL EFFECTS ELECTRONIC SIMULATOR
Filed April 27, 1967  11 Sheets-Sheet 11

Fig_13

Fig_14

Fig_15

Fig_16

Fig_17

INVENTOR.
RICHARD S. WISE
BY
ATTORNEYS

United States Patent Office 3,515,802
Patented June 2, 1970

3,515,802
SPECIAL EFFECTS ELECTRONIC SIMULATOR
Richard S. Wise, Boulder, Colo., assignor to Ball
Brothers Research Corporation, Boulder, Colo., a
corporation of Colorado
Filed Apr. 27, 1967, Ser. No. 634,249
Int. Cl. H04n 7/08
U.S. Cl. 178—6                    15 Claims

ABSTRACT OF THE DISCLOSURE

An electronic apparatus and method for simulating a condition for training purposes, especially simulation of fog and the like in a flight training simulator. Provision is made for adjusting the amount of fog, as well as provision for horizon tilting and curvature-ceiling control operable in conjunction with the training apparatus.

---

This invention relates to a special effects simulator and more particularly, to an apparatus and method for electronically simulating a condition on a TV monitor.

It is oftentimes desirable to simulate a predetermined condition, especially for training purposes. Such is the case, for example, where it is desired to provide various simulated environmental conditions for the training of pilots. As is well known, environmental, or weather, conditions are not always ideal during actual flight operations, and it is therefore desirable to simulate conditions such as fog or haze to better train the pilot to be able to cope with such conditions.

Trainers for simulating flight are well known in the art and in the type contemplated herein, a TV camera is focused on a scale model of terrain, for example (which is an airport if simulated approaches and landings are to be practiced), and the camera is moved relative to the scale model to simulate aircraft movement. The camera is controlled by a flight simulator and maneuvered in response to the pilot's handling of the controls in the trainer, as is well known in the art. Heretofore, such a trainer effectively simulated only clear weather conditions, however, and hence was not adequate for full training of a pilot to be able to cope with adverse weather conditions. It is the purpose of this invention to provide, by electronic means, adverse weather conditions, such as fog or haze, or alternately, cloud formations or the like by means of a secondary camera, to better train the pilot to meet such conditions in actual flight operations.

It is therefore an object of this invention to provide an electronic simulator capable of effectively simulating a desired condition.

It is another object of this invention to provide an electronic simulator for simulating adverse weather conditions on a TV monitor in conjunction with terrain for flight training purposes.

It is another object of this invention to provide an electronic simulator for simulating fog at or near an airport.

It is another object of this invention to provide an electronic simulator capable of providing a condition that is movable to simulate movement of a vehicle relative to terrain.

It is another object of this invention to provide an electronic simulator capable of utilization with color TV to provide a simulated condition in color.

It is another object of this inevntion to provide a method for electronically simulating a desired condition.

With these and other objects in view which will become apparent to one skilled in the art as the description proceeds, this invention resides in the novel construction, combination, and arrangement of parts, as well as a method, substantially as hereinafter described and more particularly defined by the appended claims, it being understood that such changes in the precise embodiments of the hereindisclosed invention are meant to be included as come within the scope of the claims.

The accompanying drawings illustrate two complete examples of the embodiment of the invention constructed according to the best mode so far devised for the practical application of the principles thereof, and in which.

Figure 1:
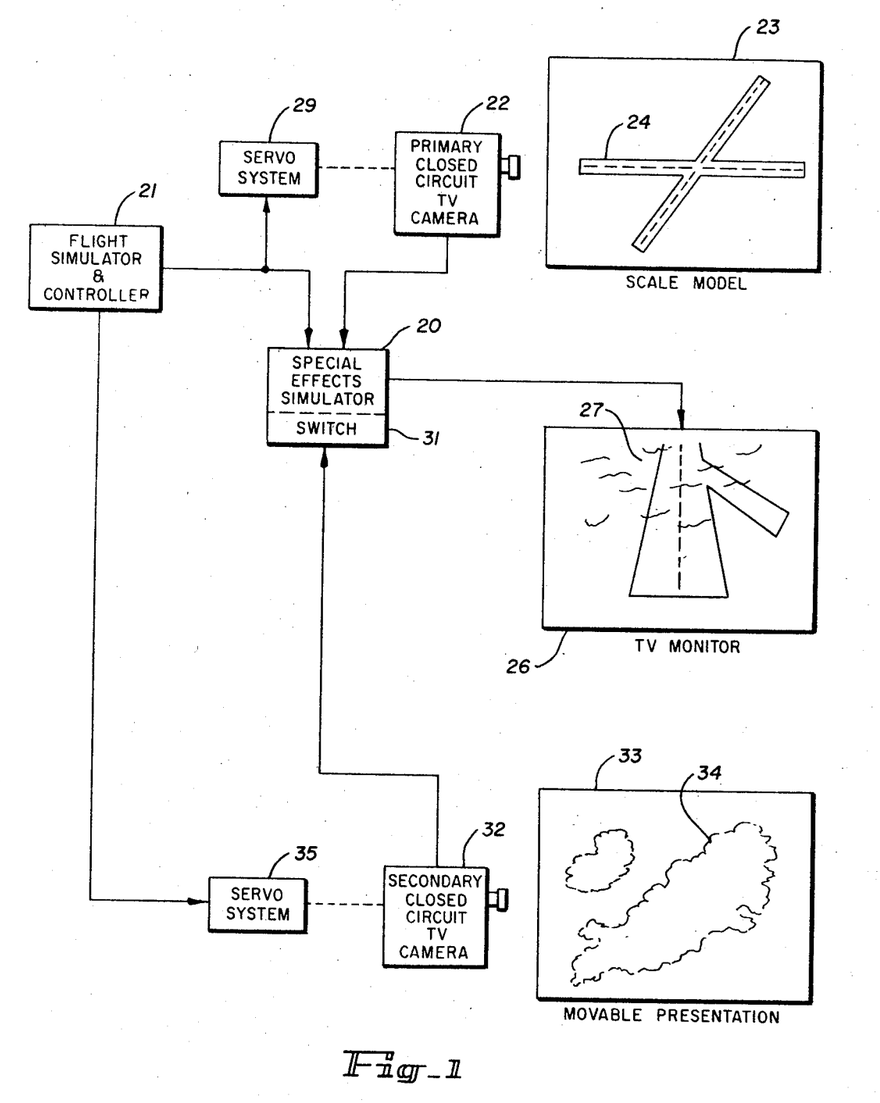
FIG. 1 is a block diagram showing the special effects simulator of this invention used in conjunction with a flight simulator trainer.

Referring now to the drawings, in which like numerals have been used for like characters, special effects simulator 20 is shown in FIG. 1 utilized in conjunction with a flight simulator and controller 21 and primary closed circuit TV camera 22. As shown, the primary closed circuit TV camera 22 is focused on a scale model 23 of an airport, and more particularly, a runway 24 of the airport. As shown on TV monitor 26 in FIG. 1, fog 27 is simulated by the special effects simulator 20. As is conventional, the primary closed circuit TV camera 22 is brought closer to the airport to simulate aircraft movement under the control of a trainee viewing the TV monitor, control of the camera 22 being through flight simulator and controller 21 and servo mechanism 29.

Although a scale model is illustrated, it is to be realized that other equally suitable presentations could be utilized such as by film or the like, if desired, as is also the case with the secondary camera discussed hereinafter.

It is the purpose of special effects simulator 20 to add weather conditions, usually fog, haze or clouds, to the presentation viewed by the trainee on the TV monitor. A switch 31 is provided in conjunction with the special effects simulator 20 so that a secondary closed circuit TV camera 32 focused on a movable presentation 33, which could be film, for example (or video tape could be used to replace the camera and the model presentation as an alternate structure). As shown, a cloud presentation 34, or the like, appearing on the movable presentation, appears on the TV monitor in lieu of the fog simulated thereon (as shown in FIG. 1) whenever the secondary camera is connected by switch 31 into the circuit.

Secondary closed circuit TV camera 32, as shown in FIG. 1, is controlled conventionally, for example, by a servo mechanism 35, which mechanism is, in turn, controlled by flight simulator and controller 21 in conventional fashion.

Figure 13:
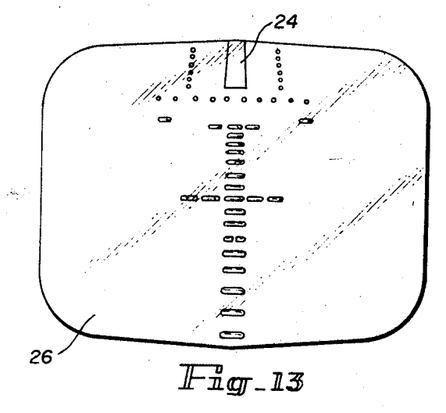
FIG. 13 is a pictorial display typically illustrating the view on the TV monitor of FIG. 1 with no adverse weather conditions.
Figure 14:
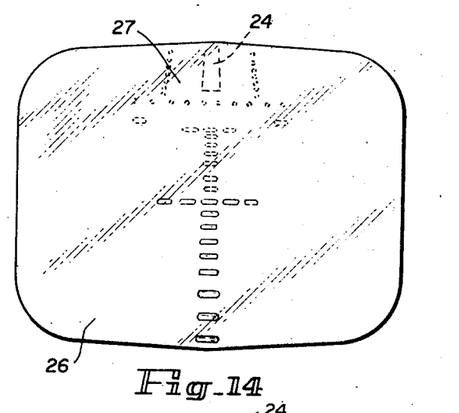
FIG. 14 is a pictorial display typically illustrating the view of the TV monitor of FIG. 1 under conditions of light fog.
Figure 15:
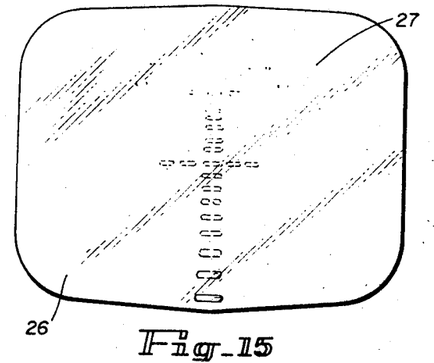
FIG. 15 is a pictorial display typically illustrating the view of the TV monitor of FIG. 1 under conditions of heavy fog.
Figure 16:
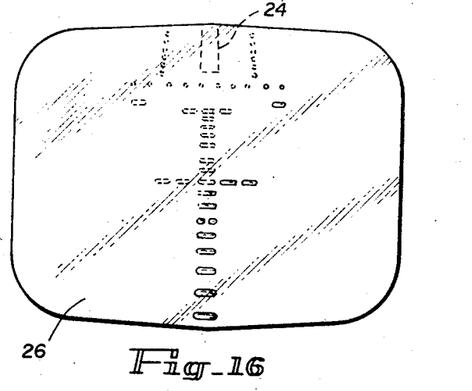
FIG. 16 is a pictorial display typically illustrating the view on the TV monitor of FIG. 1 under simulated aircraft banking with heavy fog.
Figure 17:
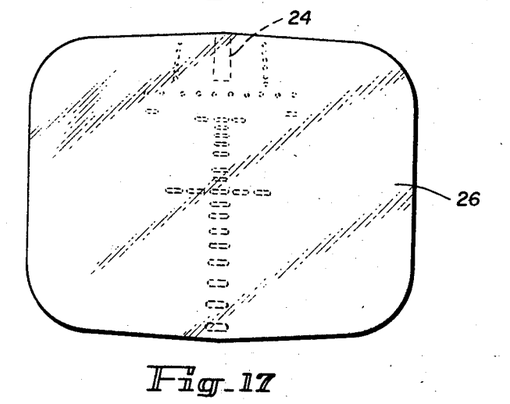
FIG. 17 is a pictorial display typically illustrating the view on the TV monitor of FIG. 1 under conditions of uniform haze.

As shown in FIG. 13, when no adverse weather conditions are simulated, the output on the TV monitor 26 will picture the primary camera view of scale model 33. If light fog is added by means of special effects simulator 20, then the trainee will no longer see the presentation of the scale model clearly throughout the presentation, but instead will see the presentation gradually disappear toward the top of the picture which represents further distance than the foreground at the bottom of the picture. Thus, an actual light fog condition is simulated, as shown in FIG. 14. If heavy fog is simulated, much less of the primary carrier picture will be seen, as shown in FIG. 15, simulating a condition of poor visibility. If the airplane should be banked or turned, then it is, of course, desirable that the fog-simulated weather conditions also be shifted with the horizon, which is the case when this invention is utilized, so that the trainee will see both the airport and the weather conditions rotate as the plane banks. For illustration purposes, however, FIG. 16 shows only the weather condition (fog) rotated. In FIG. 17, a uniform haze has been added as the weather condition visible on the TV monitor.

Figure 2:
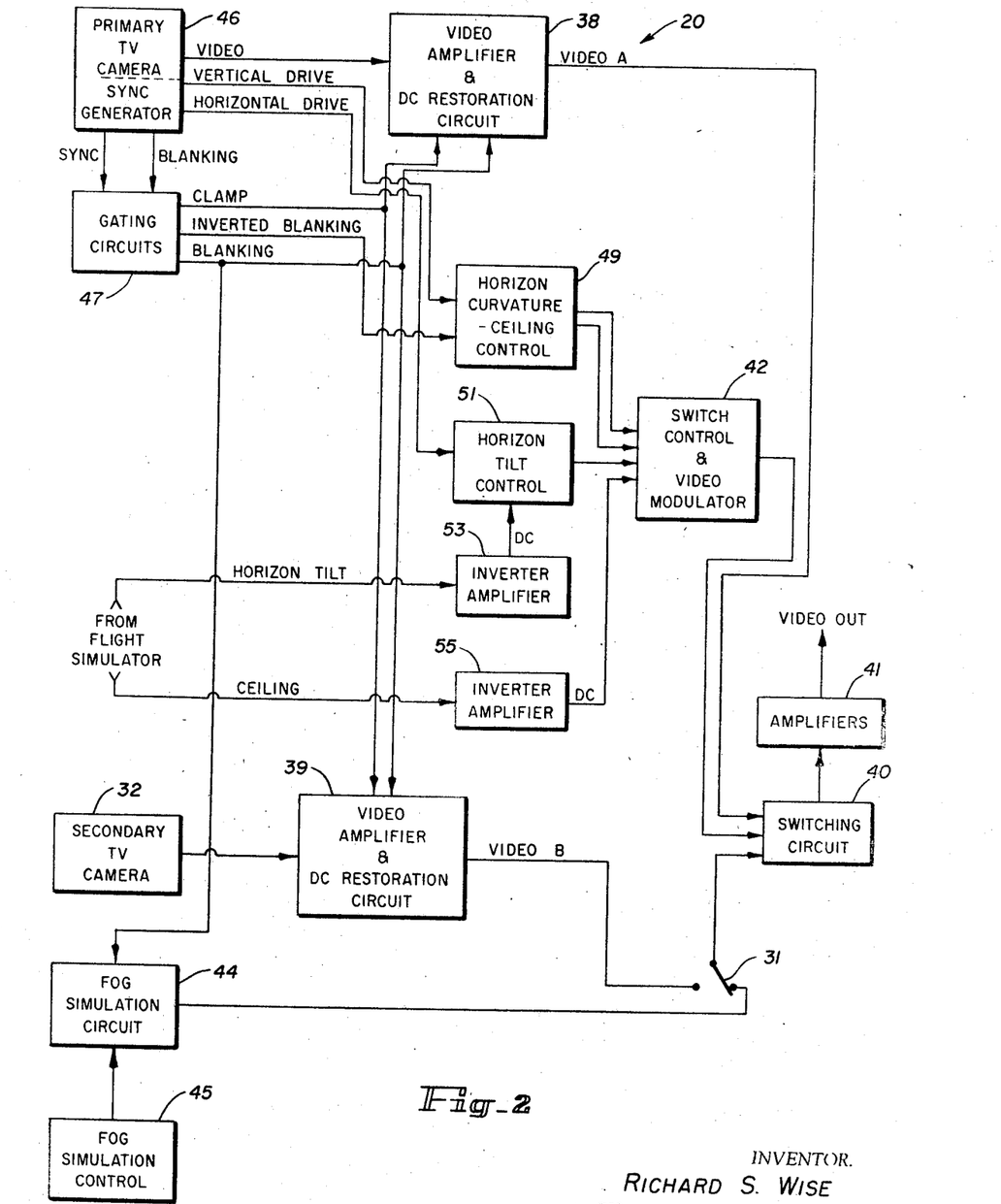
FIG. 2 is an expanded block diagram of the special effects simulator and primary camera shown in FIG. 1, together with the secondary camera as shown therein.

Referring now to FIG. 2, an expanded block diagram of the special effects simulator 20 is shown (also included in FIG. 2 are blocks representing the primary TV camera 22 and secondary TV camera 32 for explanation purposes). The output video signal from primary TV camera 22 is coupled to video amplifier and DC restoration circuit 38, while the output video from secondary TV camera 32 is coupled to video amplifier and DC restoration circuit 39. Video amplifier and DC restoration circuits 38 and 39 are preferably identical and one is shown in schematic form in FIG. 3.

Figure 3:
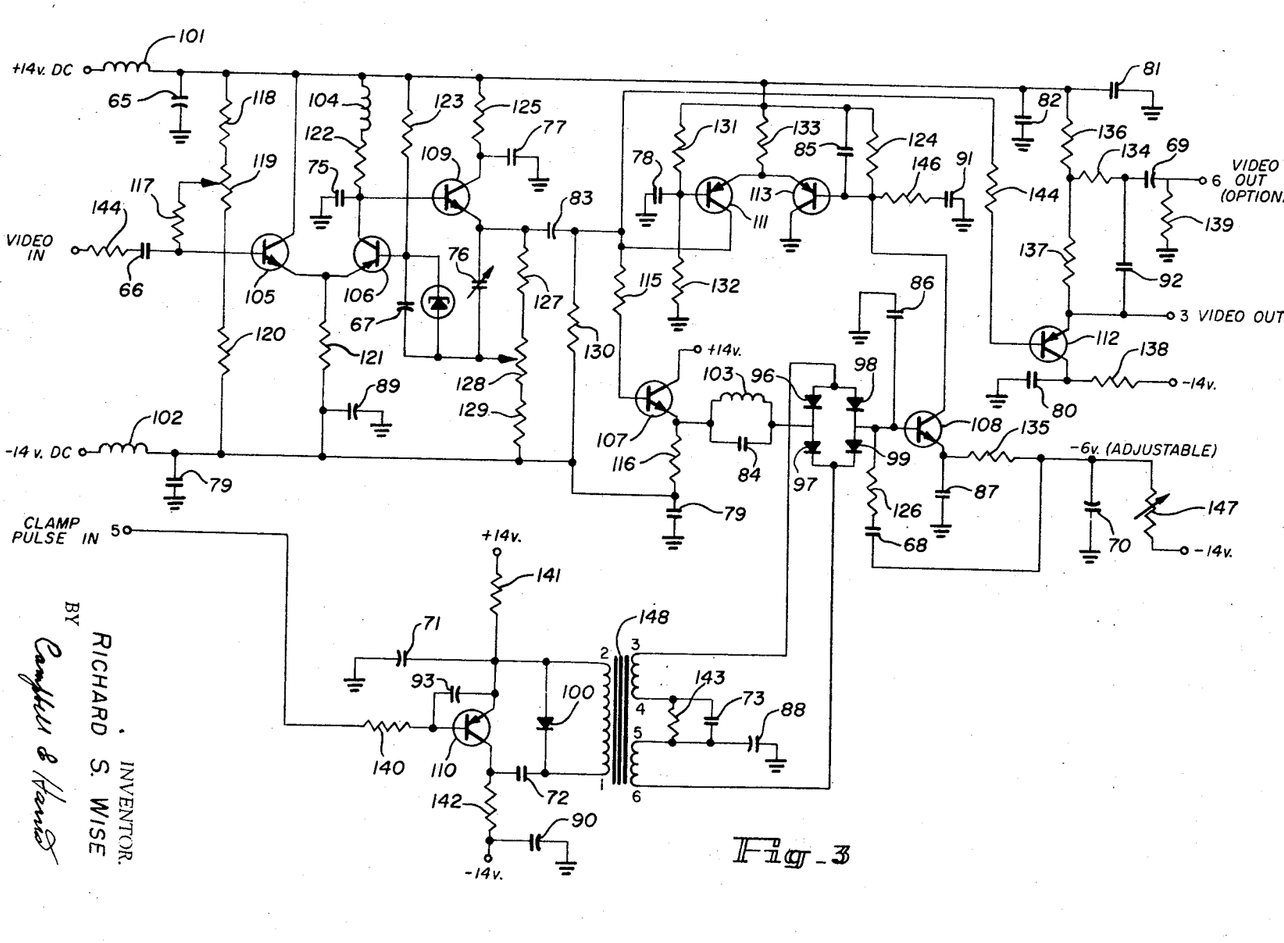
FIG. 3 is a schematic diagram illustrating the video amplifier and DC restoration circuits shown in block form in FIG. 2.

In the video amplifier and DC restoration circuits 38 and 39, the incoming video signal is amplified approximately two times and clamped to about a −4 volt DC level by the DC restoration circuit (which circuit is of the feedback type rather than the "back porch" signal clamp). The output from video amplifier and DC restoration circuits 38 and 39, identified as "video A" and "video B," respectively, are coupled to switching circuit 40. Video amplifier and DC restoration circuits 38 and 39 are high impedance video amplifiers with low output impedance characteristics.

Figure 4:
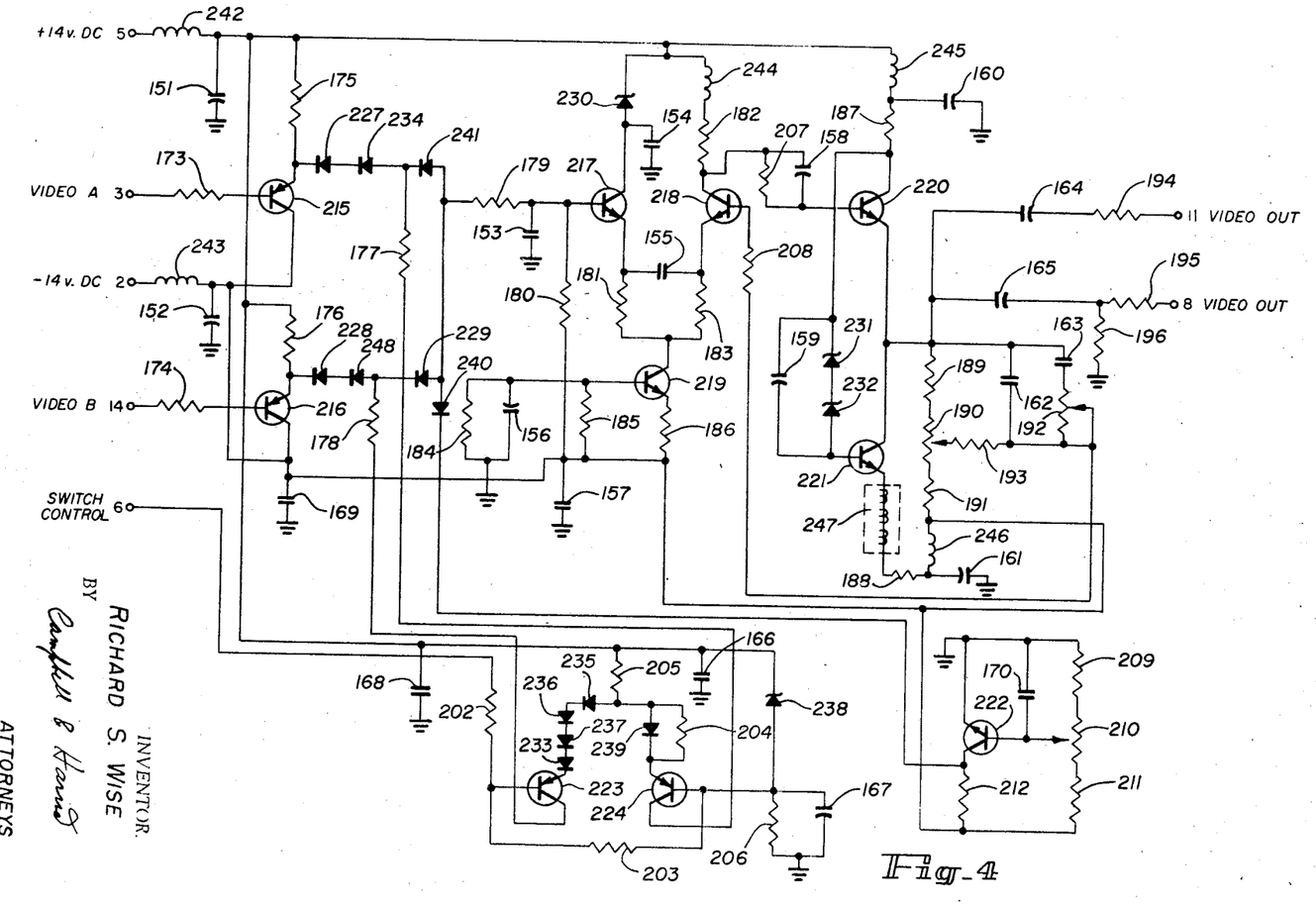
FIG. 4 is a schematic diagram illustrating the switching circuit shown in block form in FIG. 2.

Switching circuit 40 is a single pole, double-throw, slow speed video switch and is shown in schematic form in FIG. 4. Operation of switching circuit 40 is controlled by switch control and video modulator 42. The output from switching circuit 40 is coupled through amplifiers 41 to provide a low impedance "sending end terminated" output for display on the TV monitor. If desired, composite sync can be added at the output (not shown) in conventional manner.

Figure 5:
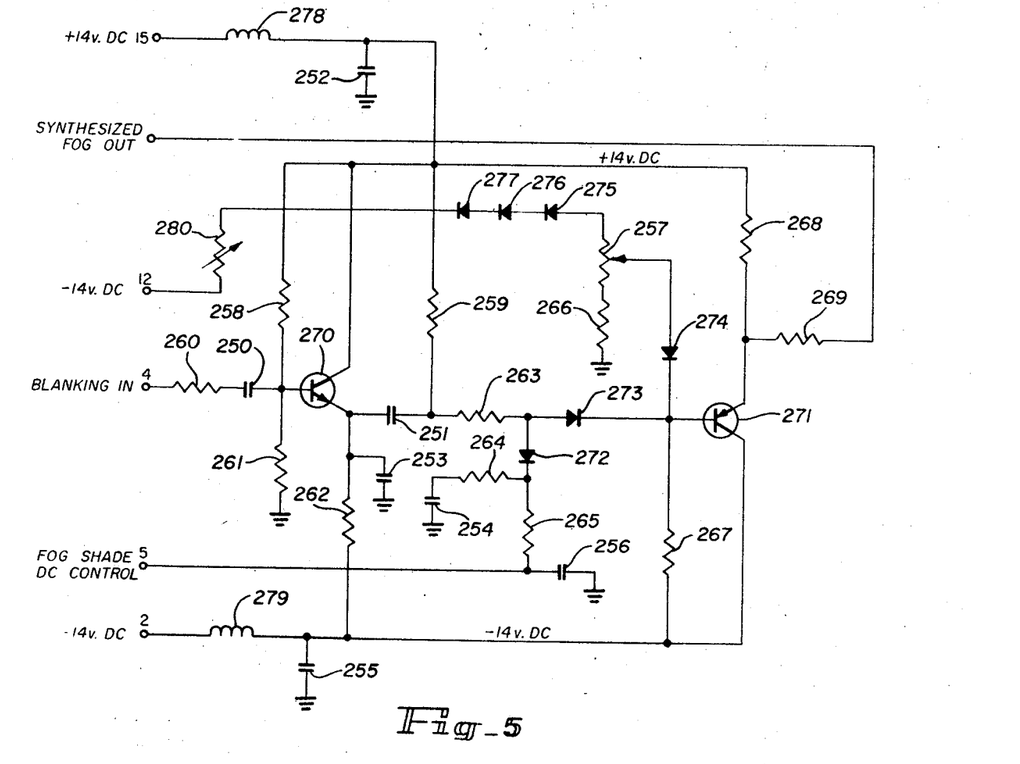
FIG. 5 is a schematic drawing illustrating the fog simulation circuit shown in block form in FIG. 2.

For fog simulation, secondary TV camera 32 is removed from the circuit by means of switch 31, which then connects fog simulation circuit 44 to switching circuit 40 in lieu of the secondary TV camera output. Fog simulation circuit 44, shown in schematic form in FIG. 5 provides the input to switching circuit 40 (through switch 31) under the control of fog simulation control 45, which control is shown in schematic form in FIG. 6. When fog simulation circuit 44 is connected to the switching circuit 40, fog is faded or mixed with the video from the primary TV camera 22 so that the viewed picture on the TV monitor has a predetermined amount of fog to represent an adverse weather condition as shown in FIGS. 14 and 15.

Figure 7:
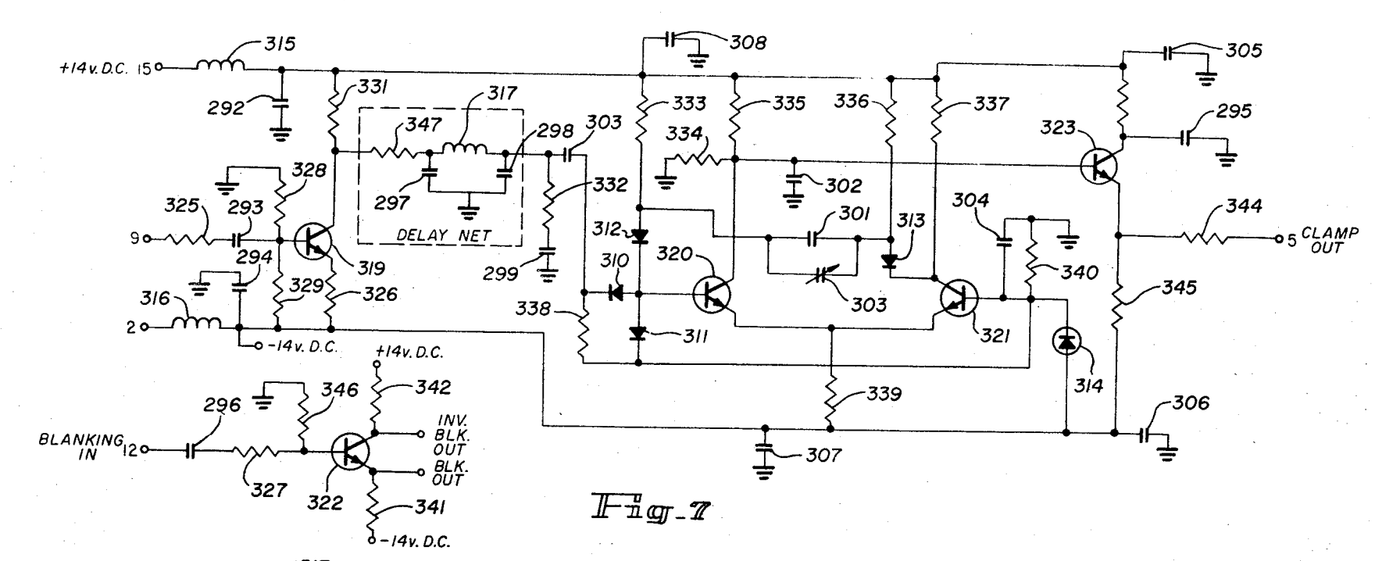
FIG. 7 is a schematic diagram illustrating the gating circuits shown in block form in FIG. 2.

The output from primary TV camera 22 includes or is connected to a sync generator 46 in conventional fashion and the sync generator supplies conventional sync and blanking outputs which are coupled to gating circuits 47, as shown in FIG. 2, with the gating circuits being shown in schematic form in FIG. 7. Gating circuits 47 supply a clamp output, an inverted blanking output, and a blanking output, as indicated in FIG. 2.

The clamp output from gating circuit 47 is supplied to video amplifier and DC restoration circuits 38 and 39 during the "back porch" interval for use with the DC restoration circuits. Gating circuits 47 act as an isolation amplifier for the sync and blanking signals, the blanking being coupled to the video amplifier and DC restoration circuits 38 and 39 and the inverted blanking output being coupled to the horizon curvature-ceiling control 49.

The composite sync input is used to produce a clamp output, and, in general, the input sync is amplified, delayed, differentiated, and coupled to a one-shot multivibrator which is then triggered by the trailing edge of the sync to generate a gate, or clamp, pulse about three microseconds in length to enable the key clamps, or DC restoration circuits, to be energized during the "back porch" interval of the video waveform. The composite blanking input is used to produce the blanking and inverted outputs by coupling the input signal through an amplifier in conventional fashion.

Figure 8:
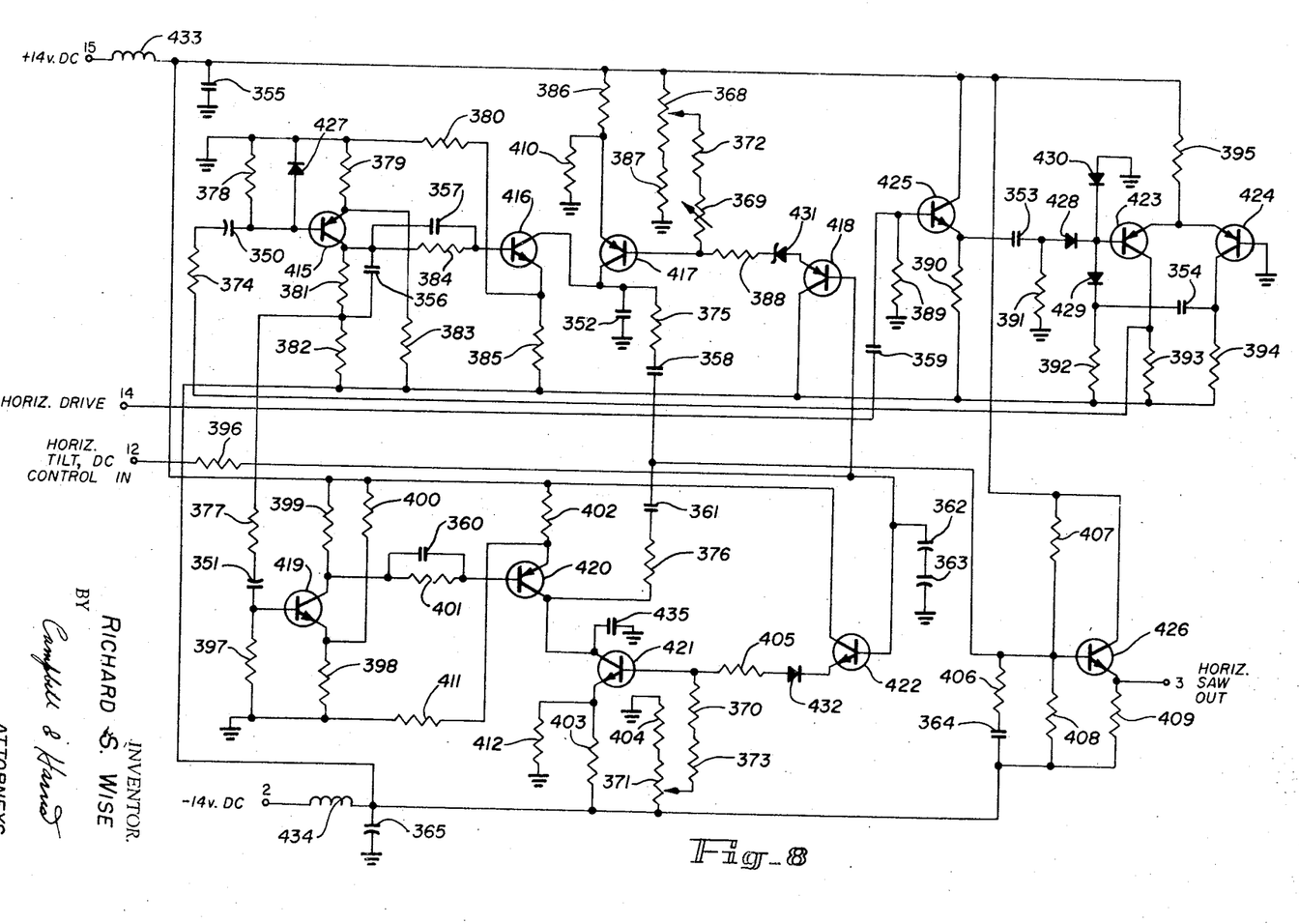
FIG. 8 is a schematic diagram illustrating the horizon tilt control shown in block form in FIG. 2.

The horizontal drive output from sync generator 46 is coupled to horizon tilt control 51 which is shown in schematic form in FIG. 8. This circuit generates a sawtooth waveform output at a line rate that can be varied in amplitude and inverted so that the resulting waveform starts as a positive saw-tooth, decays to zero, and then increases in the opposite polarity, the output being controlled by an output from the flight simulator coupled through inverter-amplifier 53, which is shown in schematic form in FIG. 10. The saw-tooth output from the horizon tilt control 51 is coupled to switch control and video modulator 42 to roll or tilt the simulated overcast or horizon.

Figure 9:
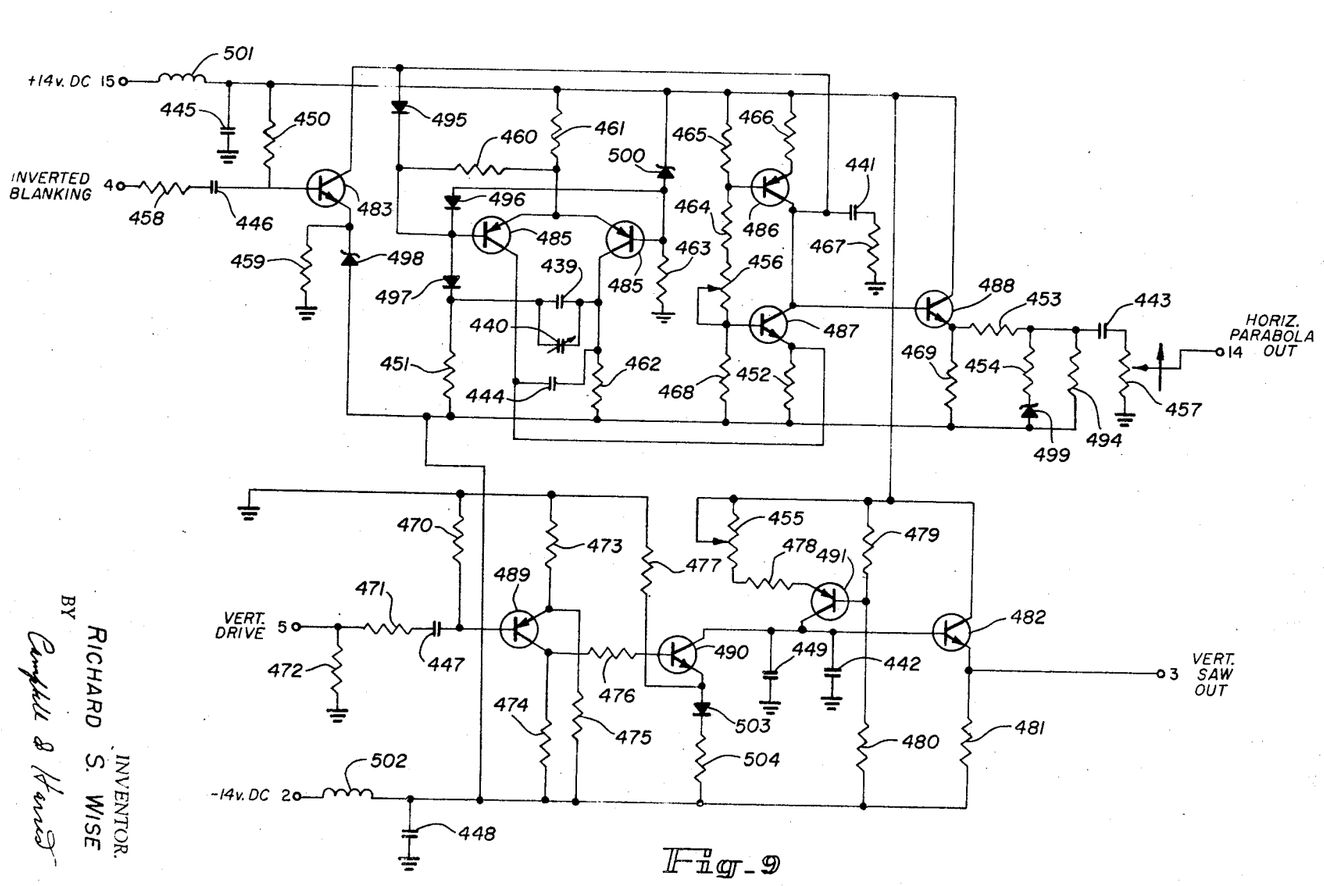
FIG. 9 is a schematic drawing illustrating the horizon curvature-ceiling control shown in block form in FIG. 2.

The vertical drive output from sync generator 46 is coupled to horizon curvature-ceiling control 49 (along with inverted blanking from gating circuits 47), control 49 being shown in schematic form in FIG. 9. Two outputs are provided and both are coupled to switch control and video modulator 42, one of which is a 60 hertz positive-going saw-tooth and the other of which is a parabola at line rate. The former is used to control the vertical position of the overcast on the TV monitor, while the latter adds curvature to the horizon, the amplitude of which is controllable to thus control the degree of curvature of the horizon.

Figure 11:
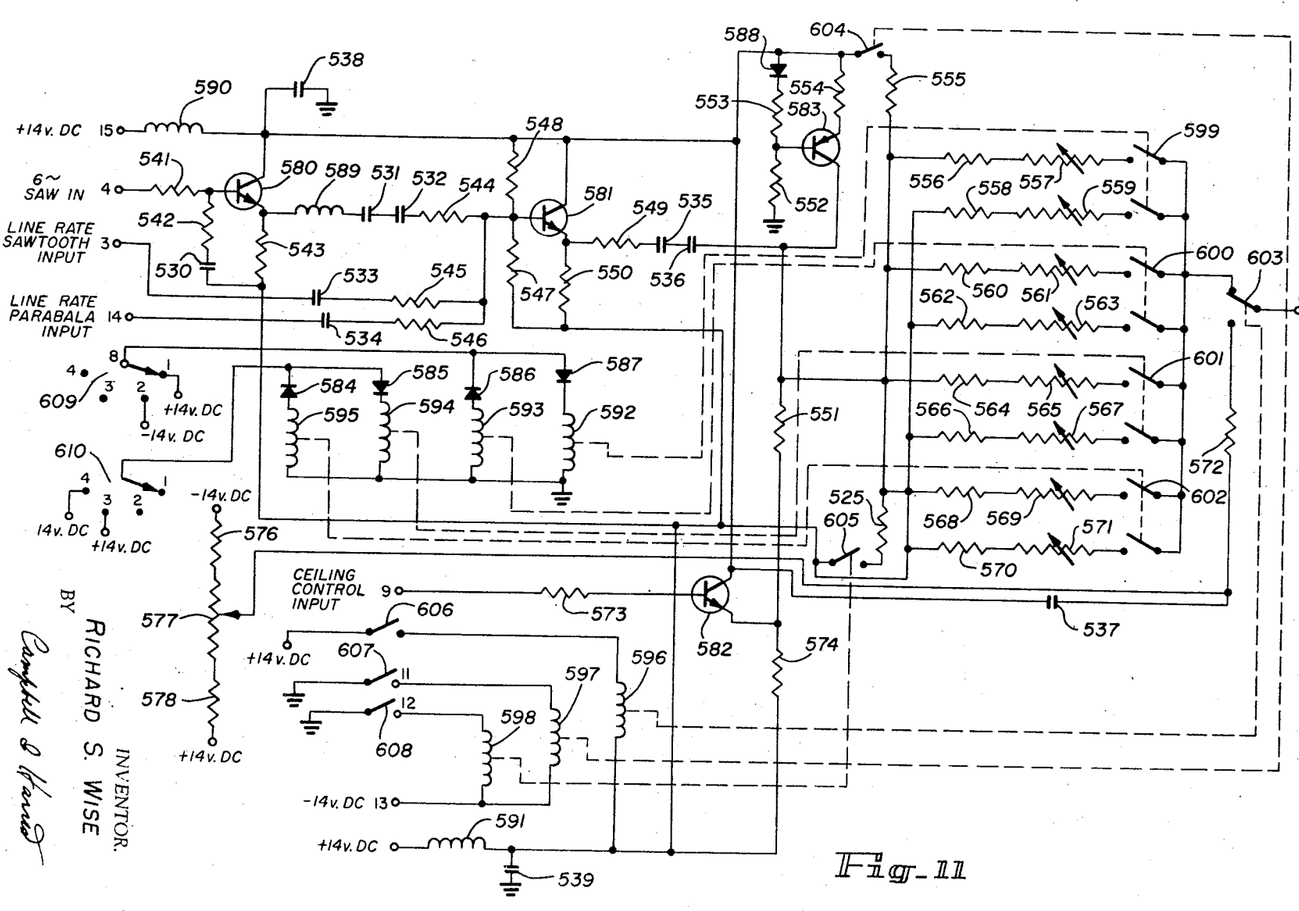
FIG. 11 is a schematic diagram illustrating the switch control and video modulator shown in block form in FIG. 2.

Switch control and video modulator 42, shown in schematic form in FIG. 11, also receives an input from inverter-amplifier 55, which, in turn, receives an input from the flight simulator. Switch control and video modulator 42 receives the various inputs and creates a waveform that modulates switching circuit 40. Also included in switch control and video modulator 42 are circuits to produce various mix-widths on the TV monitor and circuits to instantaneously raise and lower the fog curtain, all of which are shown in schematic form in FIG. 11.

Figure 12:
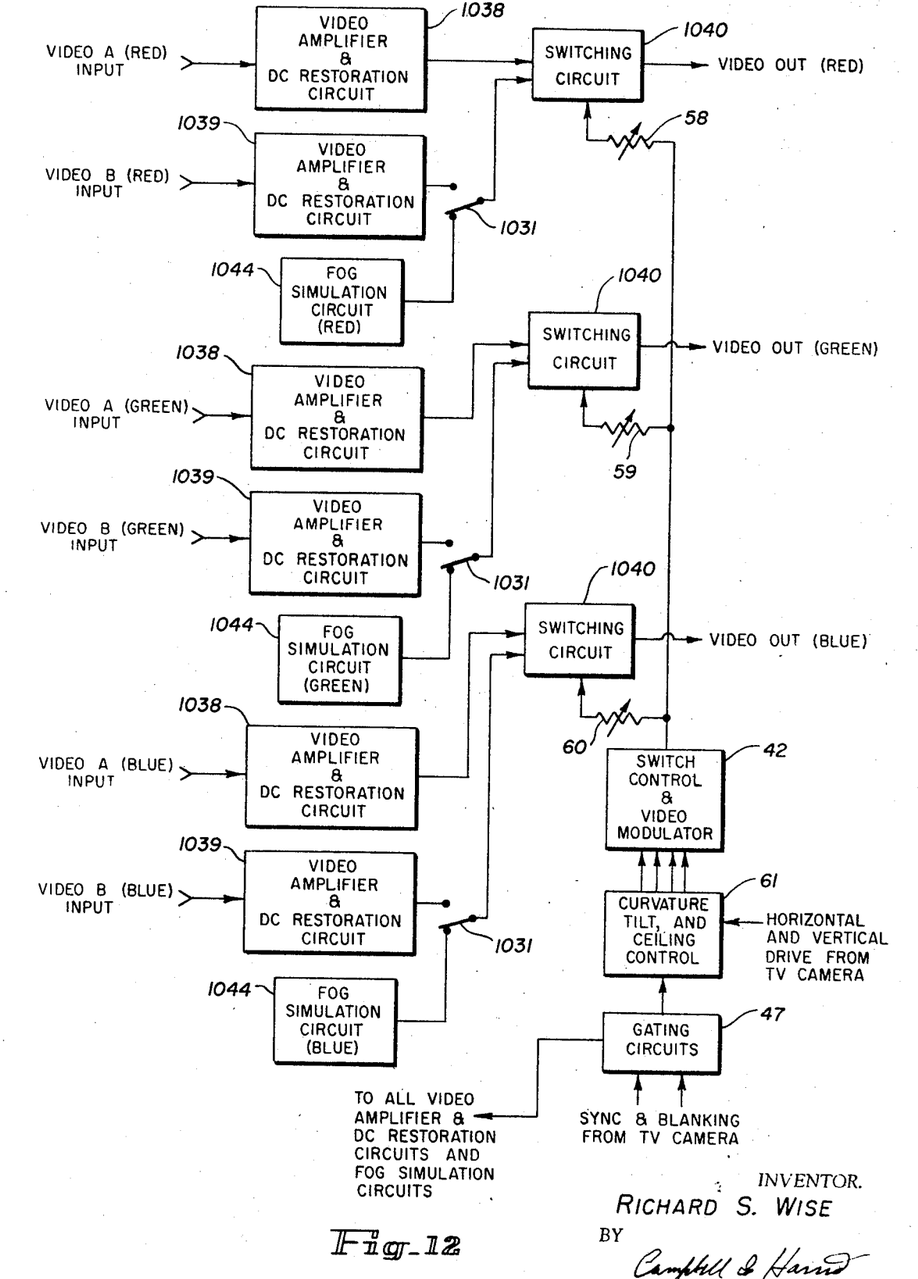
FIG. 12 is a block diagram illustrating an alternate embodiment of the simulator of this invention adapted for colored TV.

The system of this invention can also be used in conjunction with a color TV system, as shown in FIG. 12. When so utilized, the video red, green, and blue, inputs from the primary camera and secondary camera (if switched into the circuit) are coupled in each case to video amplifier and DC restoration circuits, identified in FIG. 12 by the numerals 1038 and 1039, each of which circuits corresponds to video amplifier and DC restoration circuits 38 and 39 shown in FIG. 2. In addition, fog simulation circuits 1044, corresponding in each case to fog simulation circuit 44, are furnished for the red, green, and blue inputs, with switch 1031 (corresponding to switch 31) being utilized to switch either the secondary camera output or the output from the fog simulation circuits to switching circuits 1040 (switching circuits 1040 are comparable to switching circuit 40). The three outputs (red, blue and green) are then coupled from the special effects simulator in conventional fashion. In some color TV, a fourth input, known as a "luminance channel," is also present. If present, a fourth set of video amplifier and DC restoration circuits, fog simulation circuit, and switch can be provided in the same manner to handle this fourth channel.

Switch control and video modulator 42 is identical to that of the modulator 42 shown in FIG. 2, except that potentiometers 58, 59 and 60 are provided to balance the color video outputs. The gating circuits 47 and horizon control circuits 49 and 51 (identified by the numeral 61 in FIG. 12) are identical to that shown in FIG. 2, as is the rest of the circuitry shown in FIG. 2.

As shown in FIG. 3, which is the schematic diagram of the video amplifier and DC restoration circuit (either 38 or 39), the input video is coupled through resistor 114 and capacitor 66 to the base of transistor 105. Here the video is coupled from the emitter of transistor 105 over to the emitter of transistor 106, as in the case of the conventional differential amplifier, and amplified by transistor 106. The collector of transistor 106 is coupled over to the base of emitter-follower 109. Feedback to the base of transistor 106 is obtained by means of Zener diode 94 which is tapped back to potentiometer 128. This circuit arrangement then permits transistors 105, 106 and 109 to act as an amplifier having a high input impedance and low output impedance and a voltage gain of approximately two. The precise gain is adjusted by varying potentiometer 128. Potentiometer 119 in the base circuit of transistor 105 is used to center the differential amplifier at the midpoint of its dynamic range.

The video at the emitter of transistor 109 is then coupled through capacitor 83 and resistor 144 to the base of emitter-follower 112. Note that the video has not been inverted in the first amplifier. The emitter of transistor 112 then provides a source of low impedance output video at pin 3. In addition, a source of high impedance output video is provided by means of resistors 136, 137, and 134 and supplied to pin 6. The video amplitude at pin 6 is approximately one-half the amplitude of the video at pin 3.

The DC restoration circuit is actually a DC servo system. This circuit is made up of transistor 107, diode gate circuits 96, 97, 98 and 99, and transistors 108, 111 and 113. Transistor 110 is used to pulse the gate circuit. Circuit operation of the DC servo system is as follows: the video appearing at the right side of capacitor 83 is fed down through resistor 115 to the base of emitter-follower 107. The viedo appearing at the emitter of transistor 107 is then coupled over to the diode gate circuit which is comprised of diodes 96, 97, 98 and 99. Color burst, if present, is trapped out by means of the parallel resonant circuit comprised of inductor 103 and capacitor 84 which is tuned to 3.58 megacycles.

Immediately after the sync pulse, a positive-going clamp pulse is applied to pin 5, as shown in FIG. 3. This clamp pulse is applied to the base of transistor 110 which is used to drive the primary of the transformer 148. The polarity of the transformer secondary windings are such that a positive pulse appears at tap number 3 and a negative-going pulse appears at tap number 6 on the pulse transformer. The simultaneous application of these two pulses causes a high current to flow through diodes 96 and 97 on one side of the diode gate, and diodes 98 and 99 on the other side of the diode gate. Since there is a high current flowing through all diodes, there is now a conduction path from the parallel resonant trap 103–84 over to the base of transistor 108. This path exists only during the duration of the clamp pulse, or in other words, only during the duration of the "back porch" of the video line. At all other times, it is a high impedance or open circuit. By means of this gate circuit, the DC level of the video "back porch" is then stored on capacitors 68 and 86 as well as being applied to the base of transistor 108.

A DC reference is supplied through resistors 147 and 135 to the emitter of transistor 108 so that transistor 108 acts as a DC amplifier. The collector of transistor 108 is connected to the base of transistor 113 and resistor 124. Capacitor 85 is used to filter out any high frequency component or pulses in the collector circuit of transistor 108. The signal is next coupled from the emitter of transistor 113 and over to the emitter of transistor 111. Transistor 111 is used as a DC current generator; in other words, it has a very high collector impedance. The current from the collector of transistor 111 then flows down to the right side of capacitor 83. Resistor 130 is used as a discharge circuit for capacitor 83 so that the right side of capacitor 83 discharges in the negative-going direction.

In operation, and assuming that there is a certain error signal fed into the servo system with the video "back porch" level on the right side of the capacitor 83 shifted upward, this signal is then coupled to the base of transistor 107; then from the emitter of transistor 107 it is sampled by the diode gate circuit and a charge is stored on capacitors 68 and 86 which gives a positive-going DC change. This positive-going DC signal causes greater conduction of transistor 108 which then draws additional current through resistor 124 and additional base current from transistor 113. The polarity of this error signal at the base of transistor 113 hence appears as a negative-going voltage. Since transistor 113 is a PNP type of transistor, the emitter also shifts in the negative-going direction. Since this signal is coupled directly over to the emitter of transistor 111, which is acting as a common base DC amplifier, it is biased towards cutoff or less collector current. The current flowing through resistor 130 down to the minus 14 volt bus, then discharges the right side of capacitor 83 so that it shifts in the negative direction to return to proper alignment the DC level of the "back porch." Due to the integrator networks in the base of transistor 108, the correction of the servo system occurs over an entire line rather than in one short pulse. The presence or absence of a color burst on the "back porch" should not influence the servo system in any way, inasmuch as inductor 103 and capacitor 84 act as a parallel trap at the color burst frequency.

Due to the DC bias voltages on transistors 107, 108 and 112, the DC level of the video "back porch," as seen at pin 3 on the output terminal, is approximately 2 volts positive with respect to the DC clamp reference at potentiometer 147. The clamp pulse appearing at pin 5 is approximately of 3 microseconds duration and occurs immediately after the trailing edge of the sync pulse. During the vertical blanking interval, this pulse occurs immediately after each equalizing pulse or serration in the vertical sync pulse so that it occurs at twice line frequency. Also, during this vertical blanking interval, the width of this clamp pulse is shortened up to approximately 2 microseconds duration.

Referring now to FIG. 4, switching circuit 40 is shown in schematic form. The video from channel A is supplied to pin 3. This video is DC coupled in such a way that the black level or "back porch" is at approximately −4 volts DC level. Likewise, the video from channel B is coupled in to pin 14. When the gate is closed for video channel A, a video signal progresses from pin 3 through emitter-follower 215 to diodes 227, 234, and 241, and resistor 179 to the base of transistor 217. This gate is closed by applying a positive voltage to resistor 177 from the collector of transistor 224. This gate permits a DC current flow from transistor 215 through diodes 227 and 234, up through resistor 177 to the collector of transistor 224 on one side of the gate. On the other side of the gate, a DC current flows through resistors 180, and 179, and diode 241, up through resistor 177 to the collector of transistor 224. Since diodes 227, 234, and 241, are all conducting, there is a low impedance path from transistor 215 to the base of transistor 217 of such a type that video readily passes from transistor 215 to the base of transistor 217. The video from channel B is applied to pin 14 and transistor 216 is open-circuited by means of diode gates 228, 248 and 229. Since the collector current of transistor 223 is cut off, there is no current through diodes 228, 248 and 229; therefore, they present a high impedance or open circuit to the video in the channel B. When the proper signal is applied to the gate channel, the gates applied through resistors 177 and 178 are reversed in polarity; consequently, diodes 227, 234 and 241 are nonconducting, which causes video A to be open-circuited. Since diodes 228, 248 and 229 are now conducting, video from channel B is applied to the base of transistor 217. If the switch from channel A to channel B is a slow transition, this transition appears as a fade or video mix during this interval.

The video from the base of transistor 217 is then converted to a low impedance at the emitter of transistor 217 and coupled over to the emitter of transistor 218 by a network made up of resistors 181 and 183, and capacitor 155. The amplified video which appears at the collector of transistor 218 is then coupled over to the base of transistor 220 through resistor 207 and capacitor 158. The output video subsequently appears at the emitter of transistor 220. An inverted video signal appears at the collector of transistor 220, which is then coupled down to the base of transistor 221 so that the transistors 221 and 222 act in a push-pull manner to create an amplifier with a very low output impedance. A DC feedback signal is applied to the base of transistor 218 through resistors 193 and 189 and potentiometer 190.

An AC feedback path is supplied by capacitors 162 and 163 and resistor 192 from the video output terminals. Resistor 192 is used to adjust for a minimum 60 hertz tilt. The overall video gain from the base of transistor 217 to the emitter of transistor 220 is very close to unity gain; however, it is converted from a high impedance to a very low impedance in the order of a fraction of an ohm. The video signal appears with the same polarity at the output as it does at the base of transistor 217. Two video output signals are provided by this amplifier. One video output signal appears at pin 11, and the second video output appears at pin 8. A series 75 ohm resistor in each of these output channels provides a 75 ohm "sending end" impedance.

The modulation waveform used to control the switch or mix of the two video waveforms is applied at pin 6. Next, the waveform goes through a simple voltage divider and is applied to the base of transistor 223. The circuit configuration of transistors 223 and 224 is such that when a voltage positive with respect to transistor 224 is applied to the base of transistor 223, the transistor is driven into cutoff so that the current flowing through the common emitter resistor 205 shifts over to flow through transistor 224. This shift of current from transistor 223 to transistor 224 closes the video gate of channel A and opens the video gate of channel B. The series diodes in the emitter of transistors 223 and 224 provides a smooth transition or fade from video A to video B.

Potentiometer 190 in the emitter circuit of transistor 220 is used to supply a DC current feedback path so that the DC operating level is properly centered in the dynamic range of the operating capabilities of transistors 220 and 221.

Transistor 219 in the emitter circuit of transistors 217 and 218 is used to provide a large dynamic range or AC swing for these transistors. Normally, a differential amplifier of this type makes use of a common emitter resistor; however, improved performance is obtained by replacing this common emitter resistor by a current generator circuit like that provided by transistor 219. This current generator maintains the combined emitter current of transistors 215 and 216 at a constant value as the signal swings over a wide dynamic range.

Diode 240, potentiometer 201, and transistor 222 are used as a video black level clipper. Sensitor 209 is a temperature-sensitive resistor with a positive temperature coefficient which compensates the DC drifts associated with the diodes in the video switch circuitry as well as the DC temperature drift in the DC restoration circuitry of the video input cards.

Referring now to FIG. 5, the schematic diagram of fog simulator circuit 44, the synthesized fog is derived from the blanking signal which is supplied to pin 4. This signal is coupled through a series resistor and capacitor to the base of emitter-follower 270. The signal is then coupled through capacitor 251 over to diode 272 which acts as a diode clamp circuit. The positive portion or the top of the blanking signal is to be clamped to the same potential which is supplied at pin 5. After the signal has been clamped at the top of diode 272, it is coupled through diode 273 to the base of transistor 271. Diode 273 acts as a clipper circuit along with diode 274 which is connected back to a DC potential obtained from potentiometer 257. Hence, potentiometer 257 determines the DC level of the negative portion of the blanking signal or the black level, whereas diode 272 controls the positive portion, or the white level, of this signal. The range of control of the blanking of synthesized fog is such that varous shades between light gray and dark gray can be synthesized by varying the DC control voltage at pin 5. Transistor 271 is used to convert the signal from a high impedance to a low output impedance.

Figure 6:
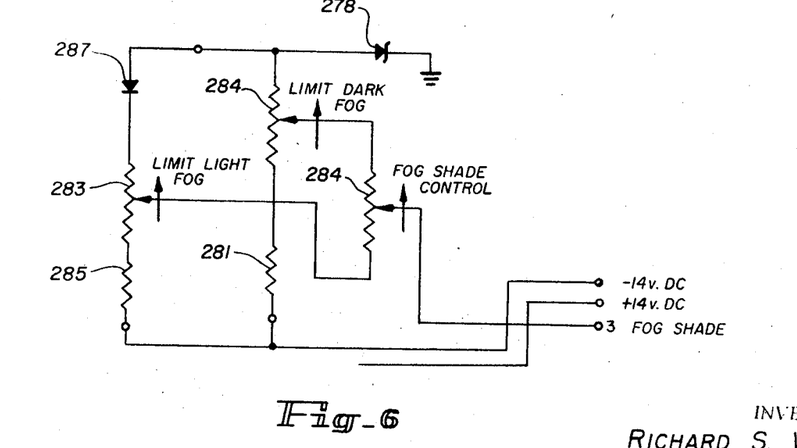
FIG. 6 is a schematic drawing illustrating the fog simulation control shown in block form in FIG. 2.

Referring now to FIG. 6, which is the schematic diagram of the fog simulation control 45, the fog control is adjusted by means of potentiometers 282, 283, and 284. In operation, the fog shade control 282 is turned to light fog and the limit potentiometer 283 is adjusted at optimum fog gray shade. Then the fog control is turned to maximum fog, or dark fog, and potentiometer limit 284 is adjusted to darkest fog desired.

Referring now to FIG. 7, which is the schematic diagram of gating circuits 47, the composite sync signal is supplied to pin 9 and coupled through to resistor 325 and capacitor 293 to the base of transistor 319. An inverted and amplified sync signal is obtained at the collector of transistor 319. This signal is delayed approximately 50 nanoseconds by the delay network made up of inductor 317 and capacitors 297 and 298. It is next differentiated by capacitor 300 and applied through diode 310 to the base of transistor 320. Transistors 320 and 321 comprise a one-shot multivibrator which can be triggered by a negative-going pulse. Hence, due to the inversion, delay, and differentiation of the sync input signal, the one-shot multivibrator is triggered approximately 50 nanoseconds after the trailing edge of the sync pulse. The multivibrator is a conventional emitter-coupled, one-shot multivibrator in which the signal is coupled from the base of transistor 320 to the emitter and then over to the emitter of transistor 321. The trigger pulse subsequently causes a negative pulse to appear at the collector of transistor 321 which is fed back through diodes 313 and 312 and capacitors 301 and 303 to the base of transistor 320 which drives it far into cutoff. Transistor 320 remains at cutoff until the charge on capacitors 301 and 303 is discharged through resistor 333; this is approximately 3 microseconds. At this time, transistor 320 comes into conduction again, which resets the multivibrator in its steady state. Note that capacitors 301 and 303 must charge through resistor 336, which is a relatively high value. This resistor is of such a value that the multivibrator can completely recover during the normal line interval; however, during the period of the equalizing pulses, or the vertical serration pulses, the timing capacitors 301 and 303 do not completely recharge, so the duration of the clamp pulses is shortened from 3 microseconds to approximately 2 microseconds. In other words, when the multivibrator is working at normal line rate, the multivibrator can completely recover and supply a 3 microsecond output pulse; however, when it operates at twice line frequencies during the equalizing pulses or vertical serration pulses, the multivibrator does not completely recover; hence, the duration fo the clamp pulse is shortened to about 2 microseconds.

A positive gate pulse is taken from the collector of transistor 320 and coupled over to emitter-follower 323, here, it is converted to a low impedance and coupled out to pin 5.

The composite blanking signal is applied to pin 12 and coupled through capacitor 296 and resistor 327 to the base of transistor 322. Transistor 322 supplies an output signal of equal amplitude and identical polarity at pin 4 with respect to the input signal; however, the signal at pin 6 is inverted by the transistor 322. Since resistors 341 and 342 are equal, the two signals appearing at the emitter and collector should be of equal amplitude but of opposite polarity. Because of the relatively large resistor in the emitter circuit of transistor 322, the transistor has a relatively high input impedance, as is also true of transistor 319.

Referring now to FIG. 8, which is the schematic diagram of the horizon tilt control 51, horizontal drive is applied to pin 14. This negative horizontal drive is coupled through emitter-follower 425, differentiated, and then applied to the one-shot multivibrator including transistors 423 and 424. This multivibrator triggers on the trailing edge of the horizontal drive pulse, i.e. the positive-going spike from the differentiation capacitor 353. A negative-going pulse, 2 microseconds wide, is generated at the collector of transistor 423 which is then applied to the base of transistor 415.

A positive-going saw-tooth at line rate is developed across capacitor 352. This capacitor is charged in the positive-going direction by the DC current which flows down through transistor 417, an acting DC current generator. This DC current flows at all times, but it can be varied. Capacitor 352 is reset or discharged in the negative-going direction by transistor 416. A delayed negative pulse from transistor 423 is applied to the base of transistor 415. The pulse is coupled in through resistor 374 and capacitor 350 to the base of transistor 415. Here the pulse is inverted and amplified in the collector circuit of transistor 415 and coupled over to the base of transistor 416. Transistor 416 is normally biased at cutoff; however, when a positive-going pulse is applied to the base, transistor 416 comes into heavy conduction so that capacitor 352 is discharged through transistor 416. At the termination of the discharge drive pulse, transistor 416 is biased to cutoff, and once again capacitor 352 is charged in the positive-going direction by means of the current generator 417. The slope of the positive-going waveform is determined by the amplitude of the DC current flowing through the emitter resistor of transistor 417 which in turn is controlled by the bias voltage applied at the base of transistor 417 by transistor 418.

A negative-going saw-tooth at line rate is developed across capacitor 435. This capacitor is charged in a negative-going direction by means of a DC current which flows up through transistor 421, an acting DC current generator. This DC current flows at all times, but it can be varied. Capacitor 435 is reset or discharged in a positive-going direction by means of transistor 420. A positive pulse is applied to the base of transistor 419 through resistor 377 and capacitor 351. Here the pulse is inverted and amplified and applied to the base of transistor 420, which is normally at cutoff. When a negative-going pulse is applied to the base of transistor 420, it comes into heavy conduction in such a way that capacitor 435 is discharged through transistor 420. At the termination of the negative pulse, transistor 420 is biased to cutoff once again, and capacitor 435 is allowed to charge in a negative-going direction (by means of the current generator 421). The slope of the negative-going saw-tooth is determined by the current flowing through the emitter-resistor of transistor 421, which is, in turn, controlled by the DC bias voltage applied to the base of transistor 421, by transistor 422.

Amplitude control of the positive-going and negative-going voltage saw-teeth are controlled in push-pull fashion by means of a DC control voltage applied to pin 12 which is subsequently applied to the base of transistors 418 and 422. For example, a negative DC voltage applied to pin 12 causes an increase of the emitter current of transistor 418 and a decrease of the emitter current of transistor 422. This consequently biases the base of transistor 417 more negative and charges capacitor 352 at a faster rate. The opposite effect occurs at transistor 422 and capacitor 435. Hence, the amplitude of the saw-tooth developed across capacitors 352 and 435 can be varied in a push-pull manner.

These two saw-teeth are added together in a matrix made up of resistor 376 and 375, and applied to emitter-follower 426. When the amplitude of these saw-teeth is equal, complete cancellation of waveforms should be obtained which correlates to a zero volt DC control voltage at pin 12. When approximately −10 volts is applied to pin 12, the positive saw-tooth at capacitor 352 is approximately 20 volts peak-to-peak, whereas the negative saw-tooth at capacitor 435 is near zero. When the +10 volts is applied at pin 12, the negative saw-tooth at capacitor 435 is approximately 20 volts peak-to-peak, whereas the other saw-tooth is near zero. Half the saw-tooth amplitude is lost in the resistor matrix 376 and 375 so that the maximum amplitude at the base of transistor 426 is a 10 volt peak-to-peak saw-tooth. This saw-tooth can be varied through zero to the other extreme by reversing the DC voltage at pin 12. The emitter-follower 426 is used to provide a low impedance output.

Referring now to FIG. 9, which is the schematic diagram of the horizon curvature-ceiling control, the horizon curvature waveform is generated by transistors 486 and 487 which act as current generators and the one-shot multivibrator consisting of transistors 484 and 485. The timing of this circuit causes a symmetrical saw-tooth to occur at line frequency. Transistors 484 and 485 are used as a one-shot multivibrator. Transistor 484 is held in conduction by base current flowing through resistor 451. When a positive trigger is supplied to the base of transistor 484, it is coupled through the emitter to the emitter of transistor 485 and then to the collector of transistor 485. This same positive trigger is then applied back through timing capacitors 439 and 440, through diode 497 and back to the base of transistor 484, which initiates regeneration so that transistor 484 is biased into cutoff. Transistor 484 remains cut off until capacitors 439 and 440 discharge through resistor 451. After capacitors 439 and 440 are discharged, transistor 484 comes into conduction again, and regeneration begins. The multivibrator resets itself in the stable state. Note that in the stable state, transistor 484 is conducting with the collector current being drawn through resistor 452. Due to the voltage developed across resistor 452, the current generator transistor 487 is at cutoff; consequently, no collector current is flowing in the collector of transistor 487. However, when transistor 484 is cut off, the current that was flowing through resistor 452 shifts over to transistor 487. This collector current is subsequently used to discharge capacitor 441.

Over-all operation of the symmetrical saw-tooth generator consisting of transistors 484, 485, 486, and 487, is as follows: assume the multivibrator is in the stable state; this causes transistor 484 to conduct and current generator 487 is cut off. The DC current flowing through current generator 486 charges capacitor 441 in the positive-going direction. When capacitor 441 is charged to an approximate DC level of +10 volts with respect to ground, diode 495 comes into conduction. This applies a positive voltage to the base of transistor 484, and transistor 484 is cut off. Regeneration within the multivibrator is initiated by this action so that a large positive-going signal is applied from the collector of transistor 485 through capacitors 439 and 440 back to the base of transistor 484. The collector of transistor 484 remains in the off state for approximately 26 microseconds. The collector of transistor 484 then appears as an open circuit as far as the current generator 487 is concerned. Transistor 485 acts as a DC current generator with the current through resistor 452 flowing up through the emitter and into the collector of transistor 487, capacitor 441 now is being discharged. During this interval, transistor 486 continues to supply a steady-state DC current. However, the DC current drawn by transistor 487 is approximately twice the current supplied by transistor 486; hence, capacitor 441 is discharged in the negative-going direction. This period of discharge continues for approximately 26 microseconds at which time the gate from the multivibrator is terminated and current generator 487 is once again biased off by means of the positive gate applied to its emitter.

Since current generator 487 is now biased off, the capacitor 441 is charged in the positive-going direction until it reaches the proper DC level to trigger the multivibrator once again. Without any synchronizing signal, the multivibrator and two current generators should free-run so that the charge and discharge time of capacitor 441 are both about 26 microseconds. The capacitor charges to approximately +10 volts DC and is also discharged to approximately −10 volts DC level with respect to ground.

To synchronize the saw-tooth generator, transistor 483 is utilized. An inverted blanking signal is applied to the base of transistor 483 from pin 4. This signal biases transistor 483 into cutoff during the active line scan but permits transistor to conduct heavily during the blanking interval so that capacitor 441 is held at approximately −10 volts DC during blanking. In the event capacitor 441 is not completely discharged or has started to charge again when transistor 483 comes into conduction, capacitor 441 is immediately reset to −10 volts DC, since the current through transistor 483 is much greater than the charge current supplied by transistor 484. After the blanking interval, transistor 483 is driven into cutoff so that capacitor 441 may begin to charge in the positive-going direction and the cycle is repeated.

It should be observed that during the field blanking interval, transistor 483 is in continuous conduction so that capacitor 441 is held in the discharged state.

The symmetrical saw-tooth across capacitor 441 is coupled out through emitter-follower 488. The network consisting of resistors 453 and 454, diode 499, and varistor 494 is used to load or clip the saw-tooth so that a parabolic waveform is generated at line rate. Potentiometer 457 is used to adjust the output waveform amplitude to give the desired horizon curvature.

The circuit operation of the 60 hertz positive-going saw-tooth generator (field rate) circuit (ceiling circuit) is similar to that of the horizon tilt card positive saw-tooth generator. The 60 hertz saw-tooth is generated across capacitor 442. Transistor 491 acts as a current generator, and transistor 489 acts as an inverter-amplifier for the vertical drive pulse which is applied to pin 5. Transistor 490 is used as the discharge transistor. The vertical drive pulse is supplied to pin 5. Capacitor 442 is charge to a DC level of approximately −2 volts and discharged to approximately −10 volts DC with respect to ground. The signal is coupled out at pin 3. The slope of the 60 hertz saw-tooth can be adjusted by potentiometer 455.

Figure 10:
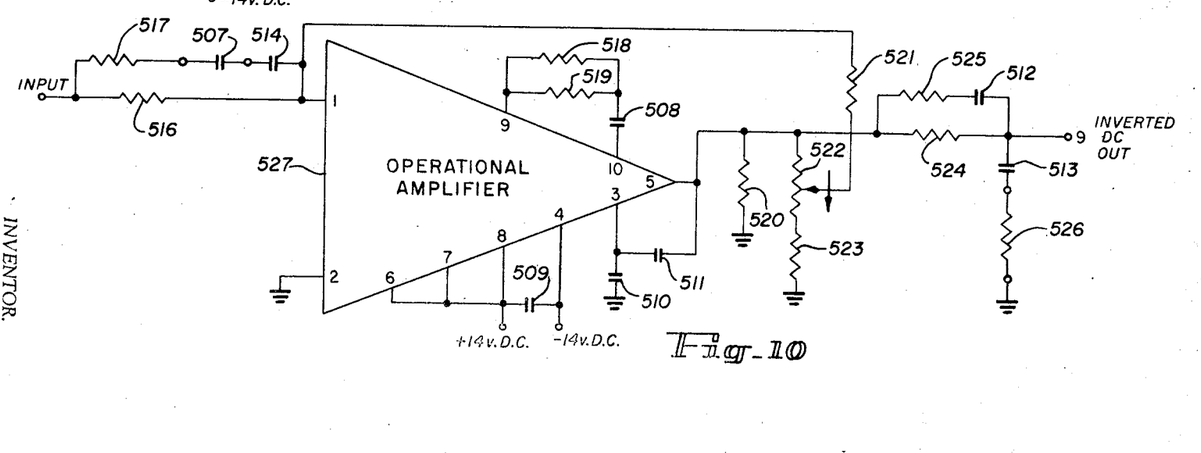
FIG. 10 is a schematic drawing illustrating the DC inverter amplifiers shown in block form in FIG. 2.

Referring now to FIG. 10, which is the schematic diagram of the inverter-amplifier, the amplifier is a DC operational amplifier. A gain potentiometer permits interface gain adjustments between the flight computer and the special effects simulator. As shown, provision is made for DC, or slow tracking, between the horizon and the primary camera.

Referring now to FIG. 11, which is the schematic diagram of the switch control and video modulator, a 60 hertz saw-tooth is applied to the emitter of transistor 580 and then applied through an isolation inductor to the base of transistor 581. Here it is combined with the saw-tooth and parabolic waveforms which occurs at line rate. Transistor 581 is used as an emitter-follower so that the combined waveforms are converted to a low impedance and AC coupled out so that they may be added to the DC voltage obtained from emitter-follower 582. This DC voltage from transistor 582 controls the vertical position of the fog curtain, whereas the combined AC voltage waveforms determine the horizon tilt and curvature. Transistor 583 is used as a DC current generator so that the ouptut has a large voltage swing capability.

Relays 592 through 595 are used to switch in various attenuator resistors as well as bias networks or centering trimpots for each mix position. Relay 592 is switched in at mix width position 1, relay 593 at mix width position 2, etc. Minimum attenuation of the modulation waveform occurs when relay 592 is energized, which also correlates to minimum mix width on the TV raster. Maximum mix width on the TV raster occurs when relay 595 is energized to apply maximum attenuation of the modulation waveform.

Relays 592 through 595 are energized by the DC voltages applied through switches 609 and 610. Diodes are used to permit each incoming wire to control two relays by applying either a +4 volt DC voltage or a −14 volt DC voltage to the appropriate pin.

Relay 596 is energized when it is desired to provide a uniform mix over the entire raster. The DC voltage applied through the voltage divider including resistors 576, 577 and 578 then controls the mix ratio between channels A and B.

Relays 597 and 598 are energized to completely raise or lower the fog curtain to simulate flying through scud.

An illustrative list of components for the schematic diagram of FIG. 3 is as follows: 65–73, capacitor, 15 μf.; 74, capacitor, 100 μf.; 75, capacitor, 10 pf.; 76, capacitor, 2.5–11 pf.; 77–82, capacitor, 0.002 μf.; 83, capacitor, 6.8 μf.; 84, capacitor, 2000 pf.; 85, capacitor 0.005 μf.; 86–87, capacitor, 0.47 μf.; 88, capacitor, 0.1 μf.; 89–90, capacitor, 0.01 μf.; 91, capacitor, 1.0 μf.; 92, capacitor, 22 pf.; 93, capacitor, 47 pf.; 94, Zener diode, 1N751A; 96–100, diode, 1N3605; 101–103, inductor, 1 μh.; 104, inductor, 18 μh.; 106–108, transistor, 2N834; 109–110, transistor, 2N2217; 111–112, transistor, 2N3251; 113, transistor, 2N3638A; 114–116, resistor, 1K; 117, resistor, 47K; 118, resistor, 18K; 119, potentiometer, 5K; 120, resistor, 12K; 121, resistor, 910; 122, resistor, 2.4K; 123–124, resistor, 10K; 125–126, resistor; 100; 127, resistor, 330; 128, potentiometer, 100; 129, resistor, 220; 130–132, resistor, 2.7K; 133–134, resistor, 470; 135, resistor, 180; 136–137, resistor, 750; 138, resistor, 220; 139, resistor 100K; 140, resistor, 1.2K; 141, resistor, 150; 142, resistor, 1.2K; 143, resistor, 3.9K; 144, resistor, 220; 146, resistor, 2.2K; 147, resistor 470±10; 148, transformer, pulse.

An illustrative list of components for the schematic of FIG. 4 is as follows: 151, capacitor, 15 µf.; 152, capacitor, 15 µf.; 153, capacitor, 5 pf.; 154, capacitor, 1000 µµf.; 155, capacitor, 15 µµf.; 156, capacitor, 15 µf.; 157, capacitor, .002 µf.; 158, capacitor, 33 µµf.; 159, capacitor, 15 µf.; 160, capacitor, 15 µf.; 161, capacitor, 15 µf.; 162, capacitor, 4.7 µf.; 163, capacitor, 4.7 µf.; 164, capacitor, 15 µf.; 165, capacitor, 1000 µf.; 166, capacitor, .002 µf.; 167, capacitor, .001 µf.; 168, capacitor, 0.002 µf.; 169, capacitor, 0.002 µf.; 170, capacitor, 15 µf.; 173, resistor, 100; 174, resistor, 100; 175, resistor, 1.8K; 176, resistor, 1.8K; 177, resistor, 2.2K; 178 resistor, 1.5K; 179, resistor, 47; 180, resistor, 6.8K; 181, resistor, 22; 182, resistor, 1.2K; 183, resistor, 33; 184, resistor, 5.1K; 185, resistor, 1.1K; 186, resistor, 100; 187, resistor, 100; 188, resistor, 100; 189, resistor, 1.2K; 190, resistor, 1K; 191, resistor 2.7K; 192, resistor, 2.5K; 193, resistor, 3.3K; 194, resistor, 75; 195, resistor, 75; 196, resistor 1K; 202, resistor, 2K; 203, resistor 4.7K; 204, resistor, 200; 205, resistor, 1.5K; 206, resistor, 680; 207, resistor, 330; 208, resistor, 68; 209, sensitor, 1.8K; 210, resistor, 1K; 211, resistor, 12K; 212, resistor, 2.2K; 215, transistor, 2N3638A; 216, transistor, 2N3638A; 217, transistor, 2N3227; 218, transistor, 2N3227; 219, transistor, 2N834; 220, transistor, 2N2217; 221, transistor, 2N2217; 222, transistor, 2N1302; 223, transistor, 2N3324; 224, transistor, 2N3251; 227, diode, 1N3605; 228, diode, 1N3605; 229, diode, 1N3605; 230, diode, 1N758A; 231, diode, 1N758A; 232, diode, 1N758A; 233, diode, 1N270; 234, diode, 1N3605; 235, diode, 1N270; 236, diode, 1N270; 237, diode, 1N127; 238, diode, 1N754A; 239, diode, 1N270; 240, diode, 1N127; 241, diode, 2.2K; 242, inductor, 1 µh.; 243, inductor, 1 µh.; 244, inductor, 4.7 µh.; 245, inductor, 4.7 µh.; 246, inductor, 4.7 µh.; 247, inductor, ferrite beads; 248, diode, 1N3605.

An illustrative list of components for the schematic diagram of FIGS. 5 and 6 are as follows: 250, capacitor, 15 µf.; 251, capacitor, 15 µf.; 252, capacitor, 15 µf.; 253, capacitor, .001 µf.; 254, capacitor, 15 µf.; 255, capacitor, 15 µf.; 256, capacitor, 15 µf.; 257, resistor, 100; 258, resistor, 47K; 259, resistor, 15K; 260, resistor, 1K; 261, resistor, 47K; 262, resistor, 3.9K; 263, resistor 330; 264, resistor, 120; 265, resistor, 470; 266, resistor, 560; 267, resistor, 10K; 268, resistor, 1.8K; 269, resistor, 82; 270, transistor, 2N834; 271, transistor, 2N3906; 272, diode, 1N3605; 273, diode, 1N3605; 274, diode, 1N3605; 274, diode, 1N3605; 275, diode, 1N270; 276, diode, 1N3605, 277, diode, 1N3605; 278, inductor, 1 µh.; 279, inductor, 1 µh.; 280, resistor, 470±10; 282, resistor 1K; 283, resistor, 100; 284, resistor, 100; 285, resistor, 1.8K; 286, resistor, 1.8K; 287, diode, 1N3605; 288, diode, 1N748.

An illustrative list of components for the schematic diagram of FIG. 7 is as follows: 292–296, capacitor, 15 µf.; 297–298, capacitor, 22 pf.; 299, capacitor, 0.01 µf.; 300–302, capacitor, 100 pf.; 303, capacitor, variable, 8–50 pf.; 304, capacitor, 0.001 µf.; 305–308, capacitor, 0.002 µf.; 310–313, diode, silicon, 1N3605; 314, Zener diode, 1N7543A; 315–316, inductor, 1 µh.; 317, inductor, 47 µh.; 319–322, transistor, 2N834; 323, transistor, 2N2217; 325–327, resistor, 1K; 328–329, resistor, 47K; 331, resistor, 1.8K; 332, resistor, 10K; 333, resistor, 39K; 334, resistor 910; 335, resistor, 1.5K; 336, resistor, 330K; 337, resistor, 3.3K; 338, resistor, 10K; 339, resistor, 560; 340–341, resistor, 1.2K; 342, resistor, 560; 343, resistor, 100; 344, resistor, 150; 345, resistor, 2.2K; 346, resistor, 15K; 347, resistor, 10.

An illustrative list of components for the schematic diagram of FIG. 8 is as follows: 350, capacitor, 15 µf.; 351 capacitor, 15 µf.; 352 capacitor, .0033 µf.; 435, capacitor, .0033 µf.; 353, capacitor, 220 pf.; 354, capacitor, 33 pf.; 355, capacitor, 15 µf.; 356, capacitor, 160 pf.; 357, capacitor, 100 pf.; 358, capacitor, .1 µf.; 359, capacitor, 1.0 µf.; 360, capacitor, 100 pf.; 361, capacitor, .1 µf.; 362 capacitor 15 µf.; 363, capacitor, 15 µf.; 364, capacitor, 100 pf.; 365 capacitor 15 µf.; 368, resistor, 200; 369, resistor, 200; 370, resistor, 200; 371, resistor, 200; 372, resistor, 330; 373, resistor, 330; 374, resistor, 1.8K; 375 resistor, 33K; 376, resistor, 33K; 377, resistor, 1.8K; 378, resistor, 3.3K; 379, resistor, 68; 380, resistor, 2.2K; 381, resistor, 3.9K; 382, resistor 1K; 383, resistor, 1.8K; 384, resistor, 10K; 385, resistor, 100; 386, resistor, 3.3K; 387, resistor, 3.3K; 388, resistor, 1.6K; 389, resistor, 10K; 390, resistor, 4.7K; 391, resistor, 10K; 392, resistor, 68K; 393, resistor, 1.8K; 394, resistor, 6.8K; 395, resistor, 4.7K; 396, resistor, 1K; 397, resistor, 3.3K; 398, resistor, 68; 399, resistor, 4.7K; 400, resistor, 1.8K; 401, resistor, 10K; 402, resistor, 100; 403, resistor, 3.3K; 404, resistor, 3.3K; 405, resistor, 1.6K; 406, resistor, 100K; 407, resistor, 470K; 408, resistor, 5.5K; 409, resistor, 10K; 410, resistor, 220K; 411, resistor, 1.5K; 412, resistor, 220K; 514, inductor, 2N1303; 416, inductor, 2N2217; 417, inductor, 2N1303; 418, inductor, 2N3638A; 419, inductor, 2N1302; 420, inductor, 2N3638A; 421, inductor, 2N1302; 422, inductor, 2N3565; 423, inductor, 2N3638A; 424, inductor, 2N3638A; 425, inductor, 2N3565; 426, inductor, 2N3565; 427, diode, 1N3605; 428, diode, 1N3605; 429, diode, 1N3605; 430, diode, 1N3605; 431, resistor, 1N747A; 432, resistor, 1N747A; 433, inductor, 1 µh.; 434, inductor, 1 µh.

An illustrative list of components for the schematic diagram of FIG. 9 is as follows: 439, capacitor, 620 pf.; 440, capacitor, 125 pf.; 441, capacitor, .0039 µf.; 442, capacitor, .5 µf.; 443, capacitor, .1 µf.; 444, capacitor, 120 pf.; 445, capacitor, 15 µf.; 446, capacitor, 15 µf.; 447, capacitor, 15 µf.; 448, capacitor, 15 µf.; 449, capacitor, .5 µf.; 450, resistor 220; 451, resistor 82K; 452, resistor, 1.3K; 453, resistor, 1K; 454, resistor, 330; 455, resistor, 2K; 456, resistor, 1K; 457, resistor, 25K; 458, resistor, 1K; 459, resistor, 4.7K; 460, resistor, 100K; 461, resistor, 1K; 462, resistor, 3.9K; 463, resistor, 1K; 464, resistor, 1.2K; 465, resistor, 332; 466, resistor, 1K; 467, resistor, 220; 468, resistor, 681; 469, resistor, 10K; 470, resistor, 3.9K; 471, resistor, 1.8K; 472, resistor, 22K; 473, resistor, 68; 474, resistor, 4.7K; 475, resistor, 1.8K; 476, resistor, 10K; 477, resistor, 2.2K; 504, resistor, 220; 478, resistor, 4.7K; 479, resistor, 220; 480, resistor, 2.2K; 481, resistor, 2.7K; 482, transistor, 2N3565; 483, transistor, 2N3565; 484, transistor, 2N3638A; 485, transistor, 2N3638A; 486, transistor, 2N1303; 487, transistor, 2N2217; 488, transistor, 2N2217; 489, transistor, 2N1303; 490, transistor, 2N2217; 491, transistor, 2N1303; 492, transistor, 2N3565; 495, diode, 1N3605; 496, diode, 1N3605; 497, diode, 1N3605; 503, diode, 1N3605; 498, varistor, 1N754A; 499, varistor, 1N759; 500, varistor, 1N754A; 501, inductor, 1 µh.; 502, inductor, 1 µh.

An illustrative list of components for the schematic diagram of FIG. 10 is as follows: 507, capacitor, lead network; 508, capacitor, .1 µf.; 509, capacitor, .1 µf.; 510, capacitor, 47 pf.; 511, capacitor, 10 pf.; 512, capacitor, lead network; 513, lag network; 514, lead network; 516, resistor, 10K; 517, lead network; 518, resistor, 10; 519, resistor, 10; 520, resistor, 10K; 521, resistor, 5.1K; 522, resistor, 5K; 523, resistor, 1.8K; 524, resistor, 10K; 525, resistor, lead network; 526, resistor, lag network; 527, operational amplifier MC1433.

An illustrative list of components for the schematic diagram of FIG. 11 is as follows: 530, capacitor, 2.2 µf.; 531, capacitor, 6.8 µf.; 532, capacitor, 6.8 µf.; 533, capacitor, .01 µf.; 534, capacitor, .01 µf.; 535, capacitor 47 µf.; 536, capacitor, 47 µf.; 537, capacitor, 6.8 µf.; 538, capacitor, 15 µf.; 539, capacitor, 15 µf.; 541, resistor, 1K; 542, resistor, 5.6K; 543, resistor, 4.7K; 544, resistor, 22K; 545, resistor, 1.5K; 546, resistor, 10K; 547, resistor, 150K; 548, resistor, 39K; 549, resistor, 1.2K; 550, resistor, 1.5K; 551, resistor, 3.3K; 552, resistor, 9.1K; 553, resistor, 2K; 554, resistor, 1K; 555, resistor, 1K; 556, resistor, 2.2K; 557, resistor, 2K; 558, resistor, 150K; 559, resistor, 100K; 560, resistor, 8.2K; 561, resistor, 5K; 562, resistor, 120K; 563, resistor, 100K; 564, resistor, 18K; 565, resistor, 10K; 566, resistor, 100K, 567, resistor, 100K; 568, resistor, 22K; 569, resistor, 20K; 570, resistor, 100K; 571, resistor, 100K; 572, resistor, 62K; 573, resistor, 1K; 574, resistor, 2.2K; 575, resistor, 1K; 576, resistor, 47; 577, resistor, 10K; 578, resistor, 47; 580, transistor, 2N3565; 581, transistor, 2N3904; 582, transistor, 2N834; 583, transistor, 2N3906; 584, diode, 1N3605; 585, diode, 1N3605; 586–588, diode, 1N3605; 589, inductor, 5H; 590, inductor, 5 $\mu$h.; 591, inductor, 1 $\mu$h.

The foregoing component lists were meant to be illustrative only and the invention is not meant to be limited to the particular components set forth.

In operation, when fog is to be simulated, the desired degree is mixed into the picture appearing in the TV monitor, as brought out hereinabove, and can, of course be altered as desired. If the secondary camera is then desired, switch 31 is thrown to connect this output to the switching circuit in place of the fog simulation circuit.

From the foregoing, it can be seen that the special effects simulator of this invention provides a heretofore unknown means and method for electronicially simulating a condition on a TV monitor.

What I claim is:

1. An electronic device for simulating a weather condition on a displayed presentation, said device comprising: first means including electronic means for generating a predetermined presentation suitable for display; second means including electronic special effects simulator means for causing at least a portion of said presentation to have a predetermined condition simulated thereon in varying degrees of intensity so that said displayed presentation portrays visibility as a function of distance dependent upon the degree of intensity of said simulated condition; and display means for displaying said presentation with said condition simulated thereon.

2. The device of claim 1 wherein said simulated weather condition is fog, and wherein said second means causes said simulated fog to decrease visibility as distance increases.

3. The device of claim 1 wherein said simulated weather condition is haze, and wherein said second means causes said simulated haze to decrease visibility as distance increases.

4. An electronic device for simulating a condition on a visually displayed presentation, said device comprising: a first closed circuit TV camera focused on a first-predetermined scene; condition simulation means for producing a signal indicating a predetermined condition; a second closed circuit TV camera focused on a second predetermined scene; a switch connected to pass the output from said condition simulation means in a first position and connected to pass the output from said second closed circuit TV camera in a second position; combining means receiving said video output from said first TV camera and said signal passed by said switch; and a monitor for receiving said combined signals so that said TV monitor presents the picture from said first TV camera with said condition simulated thereon when said switch is in said first position and the picture from said first and second TV cameras when said switch is in said second position.

5. An electronic device for simulating an adverse weather condition on a visually displayed presentation, said device comprising: a closed circuit TV camera focused on a scale model; weather condition simulation means for producing a signal indicating a predetermined weather condition, said weather condition simulation maens including means for varying the degree of weather condition simulated as a function of distance; combining means receiving said video output from said TV camera and said signal from said weather condition simulating means; and a monitor for receiving said combined video and weather condition signal so that said TV monitor presents the picture from said TV camera with said weather condition simulated thereon.

6. The device of claim 5 wherein said closed circuit TV camera is movable and wherein said weather simulation means is caused to reflect movement of said TV camera so that said weather condition appears to move with said camera movement.

7. An electronic device for simulating fog on a visually displayed presentation adapted for use with an aircraft training simulator, said device comprising: a closed circuit TV camera focused on a scale model of predetermined terrain; first control means for effecting transverse and rotational movement of said camera to simulate aircraft movement; a fog simulator circuit for producing an output signal indicative of fog; combining means for combining the video output from said TV camera and said output signal from said fog simulator circuit; a TV monitor for receiving said composite signal from said combining means and displaying said camera picture of said scale model with said fog simulated thereon; and second control means connected with said TV camera and said first control means for controlling the position of said fog in response t movement of said TV camera so that there is apparent movement of said fog substantially equal to the apparent movement of said TV camera picture.

8. The device of claim 7 wherein said first control means includes camera positioning means and a flight simulator and controller, and wherein said second control means includes means for controlling horizon tilt and curvature.

9. The device of claim 8 wherein said means for combining said video output from TV camera and said output signal from said fog simulator circuit includes switching means, and said means for controlling horizon tilt and curvature includes a switch control and video modulator connected to said switching means.

10. The device of claim 7 further characterized by a second closed circuit TV camera focused on a movable presentation and providing a second video output, and still further characterized by a switch between said fog simulator circuit and said combining means for disconnecting said fog simulator circuit from said combining means and connecting said second closed circuit TV camera video output to said combining means whereby a composite video from both said TV cameras is received by said TV monitor and displayed.

11. An electronic device for simulating a weather condition on a visually displayed presentation adapted for use with an aircraft training simulator, said device comprising: a closed circuit TV camera having sync generator means; a video amplifier and DC restoration circuit connected to receive the video output from said closed circuit TV camera; weather condition simulating means producing an output signal indicative thereof; a switching circuit receiving said video output from said video amplifier and DC restoration circuit and said output signal from said weather condition simulating means; grating circuits for receiving an output from said sync generator and producing control signals; first control means for effecting TV camera movement; second control means connected to said gating circuits, said sync generator, and said first control means; a switch control and video modulator receiving said output from said second control means, said switch control and video modulator means being connected to said switching means to control switching between said video output from said video amplifier and DC restoration circuit and said output signal from said weather condition simulating means; and a TV monitor for receiving the output from said switching means and presenting said TV camera picture with said weather condition simulated thereon.

12. The device of claim 11 further characterized by a plurality of video output signals from a color TV camera, a weather condition simulating circuits for each color video output, and a switching circuit for each color video output, each said switching circuit being controlled by said switch control and video modulator means whereby said TV monitor presents a picture in color with said weather condition simulated thereon.

13. The device of claim 11 wherein said output from said sync generator includes a blanking signal output which signal is utilized to control simulation of said weather condition on said TV picture appearing on said TV monitor.

14. An electronic device for simulating a condition on a visually displayed presentation adapted for use with an aircraft training simulator, said device comprising: a closed circuit TV camera having a sync generator and providing a video output, sync and blanking outputs, and horizontal and vertical drive outputs; a video amplifier and DC restoration circuit connected to receive said video output; gating circuits connected to receive said sync and blanking outputs and providing a clamp output, a blanking output and an inverted blanking output, said blanking and clamp outputs being coupled to said video amplifier and DC restoration circuit; a horizon curvature-ceiling control receiving said vertical drive output over said sync generator and said inverted blanking output from said gating circuits; a horizon tilt control receiving said horizontal drive from said sync generator and a control input from said aircraft flight training simulator; a switch control and video modulator receiving the outputs from said horizon curvature-ceiling control, said horizon tilt control, and a control input from said aircraft flight training simulator; a simulator circuit for producing an output signal indicative of a predetermined condition; switching means connected with said simulator circuit and said video amplifier and DC restoration circuit, said switch also being connected to said switch control and video modulator; and a TV monitor for receiving said switching circuit output and displaying a presentation of said first TV camera picture with said condition simulated thereon.

15. A method of simulating a weather condition on a visually displayed presentation, said method comprising: focusing a TV camera on a scale model; generating a picture of said scale model; generating a weather condition presentation; mixing said weather condition presentation with said TV camera picture; adjusting the intensity of said weather condition when said TV picture changes due to movement of said TV camera; and displaying said TV picture with said weather condition simulated thereon.

References Cited
UNITED STATES PATENTS

| | | | |
|---|---|---|---|
| 2,704,816 | 3/1955 | Fernsler | 313—76 |
| 3,363,332 | 1/1968 | Akkter et al. | 35—12 |

OTHER REFERENCES

IBM Technical Disclosure Bulletin, Earth Sighting Simulator by M. B. Diegert, vol. 8, No. 1, June 1965, pp. 128–130.

ROBERT L. GRIFFIN, Primary Examiner

B. L. LEIBOWITZ, Assistant Examiner

U.S. Cl. X.R.

35—12, 25